(12) United States Patent
Dhanyamraju et al.

(10) Patent No.: US 10,078,364 B2
(45) Date of Patent: Sep. 18, 2018

(54) SYSTEM AND METHOD FOR OPTIMIZING POWER CONSUMPTION OF ONE OR MORE DEVICES

(71) Applicant: HCL Technologies Limited, Noida (IN)

(72) Inventors: S U M Prasad Dhanyamraju, Hyderabad (IN); Arvind Kumar Maurya, Noida (IN); Sriganesh Sultanpurkar, Hyderabad (IN); Karthik Leburi, Hyderabad (IN)

(73) Assignee: HCL TECHNOLOGIES LIMITED, Noida (IN)

( * ) Notice: Subject to any disclaimer, the term of this patent is extended or adjusted under 35 U.S.C. 154(b) by 141 days.

(21) Appl. No.: 15/399,162

(22) Filed: Jan. 5, 2017

(65) Prior Publication Data
US 2017/0205866 A1    Jul. 20, 2017

(30) Foreign Application Priority Data
Jan. 14, 2016    (IN) .............................. 201611001447

(51) Int. Cl.
G06F 1/00    (2006.01)
G06F 1/32    (2006.01)

(52) U.S. Cl.
CPC .......... G06F 1/3296 (2013.01); G06F 1/3206 (2013.01); *Y02D 10/172* (2018.01)

(58) Field of Classification Search
CPC .... G06F 1/3296; G06F 1/3206; Y02D 10/172
USPC ................................ 713/340.3, 320; 726/23
See application file for complete search history.

(56) References Cited

U.S. PATENT DOCUMENTS

| | | | |
|---|---|---|---|
| 7,802,241 B2 * | 9/2010 | Roy | .......................... G06F 9/30 713/300 |
| 8,726,281 B2 | 5/2014 | Raghavan et al. | |
| 8,799,693 B2 | 8/2014 | Vick et al. | |
| 9,740,267 B1 * | 8/2017 | Cordero | ................ G06F 1/3275 |

(Continued)

OTHER PUBLICATIONS

Schubert, S.; Kostic, D.; Zwaenepoel, W. ; Shin, K.G., "Profiling Software for Energy Consumption", Nov. 20-23, 2012, 8 pages.

*Primary Examiner* — Aurel Prifti
(74) *Attorney, Agent, or Firm* — Shumaker, Loop & Kendrick, LLP

(57) ABSTRACT

Disclosed are systems and methods for optimizing power consumption of devices. The system includes monitoring module, generating module, matching module, determining module, and identifying module. The monitoring module monitors a device including program code which further includes power consuming functions. The generating module generates plurality of power patterns corresponding to the power consuming functions. The matching module matches the plurality of power patterns with pre-stored plurality of power patterns to identify one or more power patterns having maximum peak value. The determining module determines occurrence of the one or more power patterns for predefined time interval. The identifying module identifies a power consuming function corresponding to a power pattern based on the occurrence. The generating module generates recommendation for the power consuming function by suggesting changes in a code section of the power consuming function.

10 Claims, 6 Drawing Sheets

(56) References Cited

U.S. PATENT DOCUMENTS

| | | | | |
|---|---|---|---|---|
| 2004/0268159 | A1* | 12/2004 | Aasheim | G06F 1/3203 |
| | | | | 713/300 |
| 2007/0220292 | A1* | 9/2007 | Ishihara | G06F 17/5022 |
| | | | | 713/320 |
| 2009/0327784 | A1* | 12/2009 | Shah | G06F 11/3006 |
| | | | | 713/340 |
| 2012/0084028 | A1* | 4/2012 | Kumar | G06F 1/3206 |
| | | | | 702/61 |
| 2013/0124901 | A1* | 5/2013 | Mayer | G06F 1/32 |
| | | | | 713/340 |
| 2013/0185581 | A1* | 7/2013 | Michalak | G06F 9/5094 |
| | | | | 713/340 |
| 2013/0318607 | A1* | 11/2013 | Reed | G06F 11/3062 |
| | | | | 726/23 |

* cited by examiner

SYSTEM AND METHOD FOR OPTIMIZING POWER CONSUMPTION OF ONE OR MORE DEVICES

CROSS-REFERENCE TO RELATED APPLICATIONS AND PRIORITY

The present application claims priority from Indian Patent Application No. 201611001447, filed on Jan. 14, 2016, the entirety of which is hereby incorporated by reference.

TECHNICAL FIELD

The present subject matter described herein generally relates to a method and a system for optimizing power consumption of one or more devices.

BACKGROUND

Embedded devices are basically special purpose devices/computing machines that are capable of performing a specific task. In recent years, rapid growth using these embedded devices has occurred due to evolution of Internet of Things (IoT). Nowadays, use of embedded devices can be seen from a simple and small-scale system to complex systems. However, this rapid growth in the usage of embedded devices demands more power for running these embedded devices. The embedded devices mostly run on a battery power, which limits the power consumption of these devices.

This limitation generates a need of power optimization in the power consumption of these embedded devices. In many cases where these embedded devices are used in complex systems, replacement of the embedded devices is not easily possible, and therefore, optimizing the power consumption of these embedded devices is one possible solution. Various approaches/techniques are available for optimizing the power consumption; however, these approaches/techniques merely rely on static power measurements, which do not always provide a desired outcome.

SUMMARY

This summary is provided to introduce aspects related to systems and methods for optimizing power consumption of one or more devices are further described below in the detailed description. This summary is not intended to limit the scope of the subject matter.

In one implementation, a system for optimizing power consumption of one or more devices is disclosed. The system includes a processor and a memory coupled to the processor. The processor may execute a plurality of modules stored in the memory. The plurality of modules may include a monitoring module, a generating module, a matching module, a determining module, and an identifying module. The monitoring module may monitor a device including a program code. Further, the program code includes a plurality of power consuming functions corresponding to a plurality of functionalities associated with the device. The generating module may generate a plurality of power patterns corresponding to the plurality of power consuming functions. Further, the plurality of power patterns is generated based on a voltage change when an electrical power is supplied to the device. Further, each power pattern has peak-level fluctuations and non-peak level fluctuations. The matching module may match each power pattern of the plurality of power patterns that corresponds to the peak-level fluctuations with a pre-stored plurality of power patterns in order to identify one or more power patterns, amongst the plurality of power patterns, having a maximum peak value indicating a highest peak-level fluctuation. Further, the determining module may determine occurrence of the one or more power patterns having the maximum peak value for a predefined time interval. Further, the identifying module may identify at least one power consuming function corresponding to at least one power pattern, of the one or more power patterns having the maximum peak value, based on the occurrence. Further, the generating module may generate a recommendation for the at least one power consuming function, wherein the recommendation includes one or more changes in a code section, of the program code, associated with the at least one power consuming function in order to optimize the power consumption of the device.

In another implementation, a method for optimizing power consumption of one or more devices is disclosed. The method may comprise monitoring, by a processor, a device including a program code. The program code further includes a plurality of power consuming functions corresponding to a plurality of functionalities associated with the device. The method may further include a step of generating, by the processor, a plurality of power patterns corresponding to the plurality of power consuming functions. The plurality of power patterns is generated based on a voltage change when an electrical power is supplied to the device. Further, each power pattern has peak-level fluctuations and non-peak level fluctuations. The method may further include a step of matching, by the processor, each power pattern of the plurality of power patterns that corresponds to the peak-level fluctuations with a pre-stored plurality of power patterns in order to identify one or more power patterns, amongst the plurality of power patterns, having a maximum peak value indicating a highest peak-level fluctuation. Further, the method may include a step of determining, by the processor, occurrence of the one or more power patterns having the maximum peak value for a predefined time interval. The method may further include a step of identifying, by the processor, at least one power consuming function corresponding to at least one power pattern, of the one or more power patterns having the maximum peak value, based on the occurrence. Further, the method may include a step of generating, by the processor, a recommendation for the at least one power consuming function. Further, the recommendation comprises one or more changes in a code section, of the program code, associated with the at least one power consuming function in order to optimize the power consumption of the device.

Yet in another implementation, anon-transitory computer readable medium embodying a program executable in a computing device for optimizing power consumption of one or more devices is disclosed. The program may include a program code for monitoring a device including a program code. Further, the program code comprises a plurality of power consuming functions corresponding to a plurality of functionalities associated with the device. The program may further include a program code for generating a plurality of power patterns corresponding to the plurality of power consuming functions. The plurality of power patterns is generated based on a voltage change when an electrical power is supplied to the device. Further, each power pattern has peak-level fluctuations and non-peak level fluctuations. The program may further include a program code for matching each power pattern of the plurality of power patterns that corresponds to the peak-level fluctuations with a pre-stored plurality of power patterns in order to identify one or more power patterns, amongst the plurality of power patterns, having a maximum peak value indicating a highest peak-level fluctuation. Further, the program may include a program code for determining occurrence of the one or more power patterns having the maximum peak value for a predefined time interval. The program may further include a program code for identifying at least one power consuming function corresponding to at least one power pattern, of the one or more power patterns having the maximum peak value, based on the occurrence. Further, the program code may include a program code for generating a recommendation for the at least one power consuming function, wherein the recommendation includes one or more changes in a code section, of the program code, associated with the at least one power consuming function in order to optimize the power consumption of the device.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
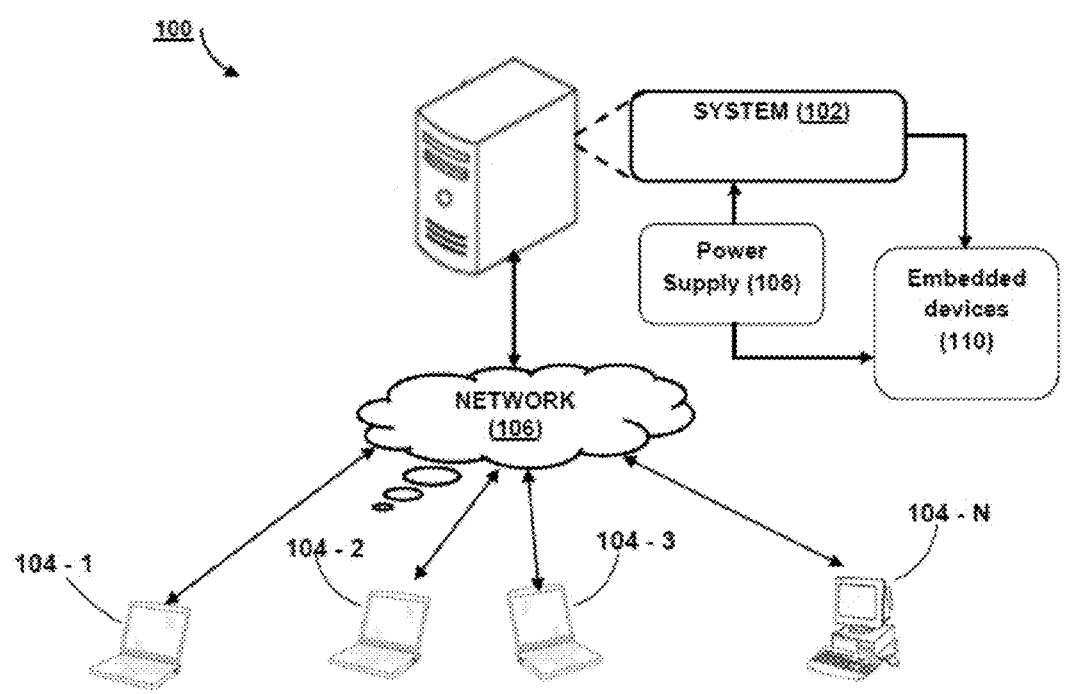
FIG. 1 illustrates a network implementation of a system for optimizing power consumption of one or more devices, in accordance with an embodiment of the present subject matter.

Referring to FIG. 1, a network implementation 100 of system 102 for optimizing power consumption of one or more devices is illustrated, in accordance with an embodiment of the present subject matter. Although the present subject matter is explained considering that the system 102 is implemented for optimizing power consumption of the one or more devices, it may be understood that the system 102 may also be implemented in a variety of computing systems, such as a notebook, a network server, a tablet, a mobile phone, and the like. However, according to embodiments of present disclosure, the one or more devices may be embedded devices. In one embodiment, the system 102 may be implemented in a cloud-based environment. It will be understood that the system 102 may be accessed by multiple users through one or more user devices 104-1, 104-2, 104-3, 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106. Further, the system 102 may be further connected with a power supply 108 and embedded devices 110 to be tested for power optimization.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
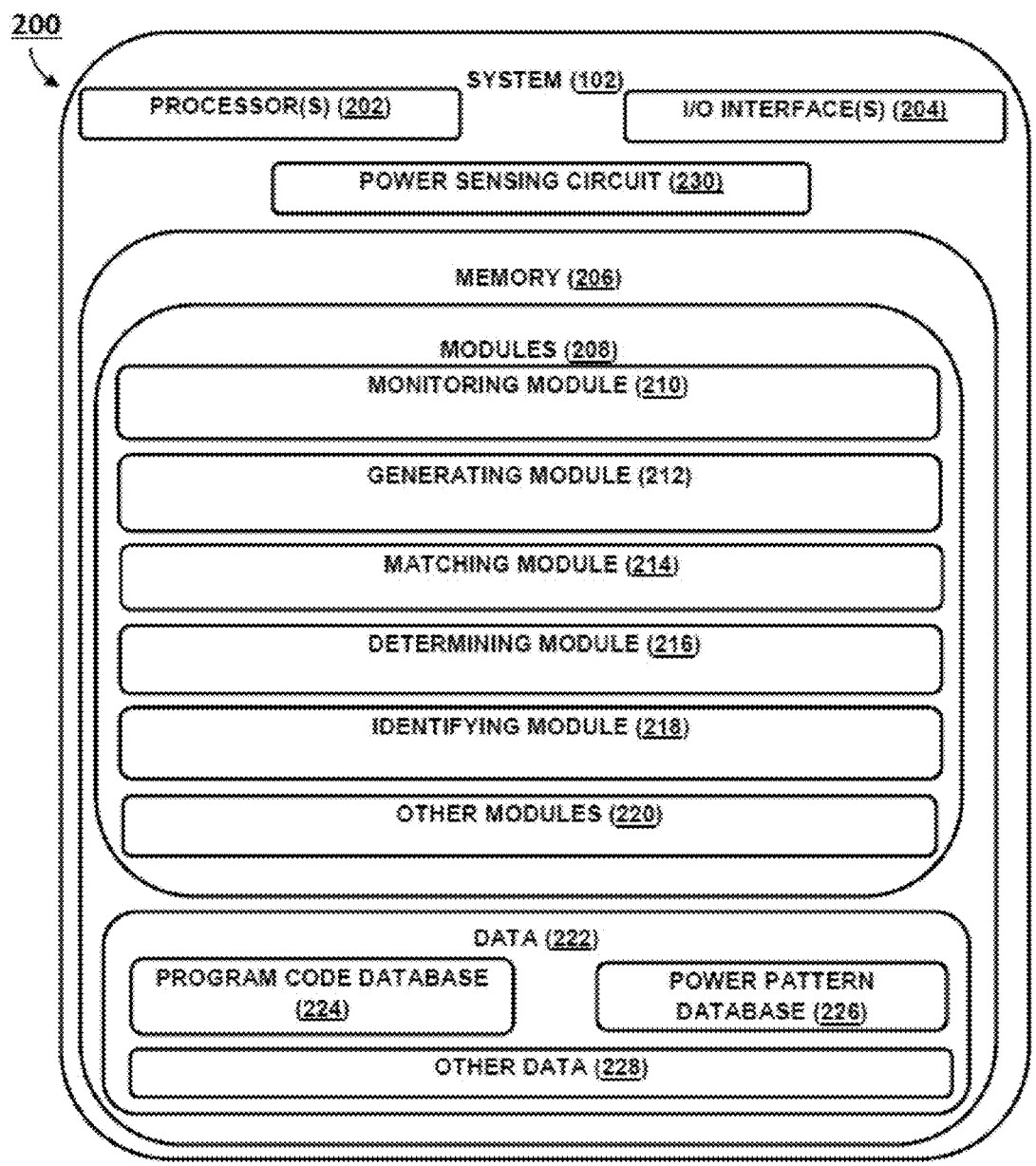
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, a memory 206, and a power sensing circuit 230. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions or modules stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 and data 222.

The modules 208 include routines, programs, objects, components, data structures, etc., which perform particular tasks or implement particular abstract data types. In one implementation, the modules 208 may include a monitoring module 210, a generating module 212, a matching module 214, a determining module 216, an identifying module 218, and other modules 220. The other modules 220 may include programs or coded instructions that supplement applications and functions of the system 102.

The data 222, amongst other things, serves as a repository for storing data processed, received, and generated by one or more of the modules 208. The data 222 may also include a program code database 224, a power pattern database 226, and other data 228. Further, each of the aforementioned modules is explained in detail in subsequent paragraphs of the specification.

Referring now to FIGS. 3A-3E, FIGS. 3A-3F illustrate detailed explanations of the system working, in accordance with an embodiment of the present subject matter. The present disclosure relates to optimizing power consumption of one or more devices. The one or more devices may be embedded devices working independently or in collaboration in a small-scale or complex system. As it is conventionally known that most of the embedded devices work on a battery power, and that's why, the power consumption of these embedded devices gets restricted. Thus, optimizing the power consumption of the embedded devices is a solution proposed by the present disclosure. However, there are other techniques are also available for optimizing the power consumption of the embedded devices, but they are based on static power measurement only.

Therefore, the focus of the present disclosure is on source code or program code running on these embedded devices. The program code comprises various functions associated with various operations/functionalities of the embedded devices. Some of these functions are more power consuming i.e., they let the embedded device to consume more power while performing a particular operation/task, and therefore, reduce the battery life of that embedded device. Thus, one of the objective of the present disclosure is to identify such power intensive functions for optimizing the overall power consumption of the embedded device, which is further explained in detail in subsequent paragraphs of the specification.

Figure 3A:
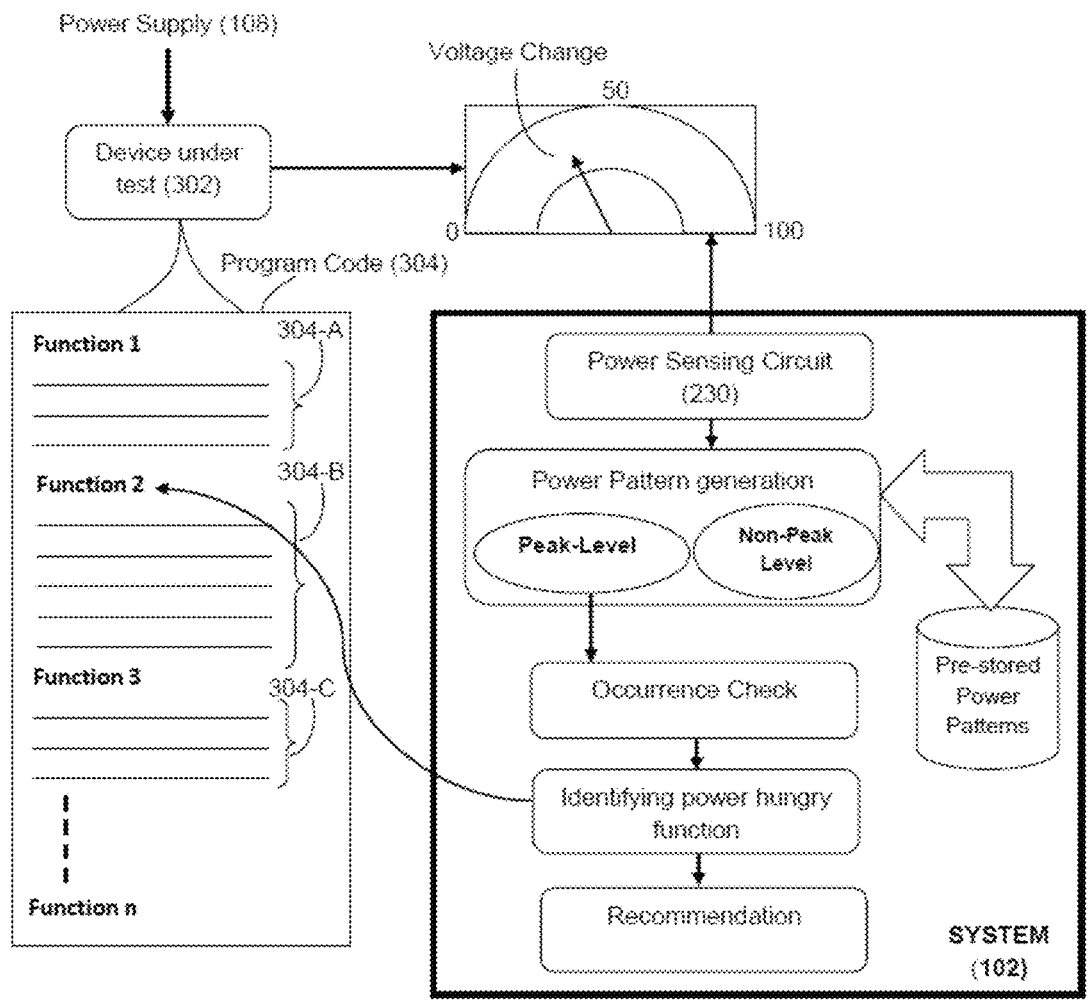
FIG. 3A illustrates a detailed explanation of the system working in accordance with an embodiment of the present subject matter.

For example, as shown in FIG. 3A, a device 302 (i.e., an embedded device) under test is shown in left hand side of the figure which is connected with a power supply 108 and the system 102. The monitoring module 210 of the system 102 monitors all activities of the device 302. Further, a program code 304, along with a plurality of power consuming functions running on the device 302, is stored in the program database 224 of the system 102. These power consuming functions are associated with various functionalities of the device 302. These functionalities may be like print operation or ping operation performed by the device. When an external power (i.e., an electrical power) is supplied on the device 302 by the power supply 108, a voltage change is detected in the device 302. This voltage change is sensed by the power sensing circuit 230 of the system 102. According to embodiments of present disclosure, the power sensing circuit 230 is capable of sensing/measuring the voltage change to as minimum as "1 nano volts". Thereafter, the voltage change is amplified to a range of 0.1 V-3 V. Based on the voltage change, the generating module 212 generates a plurality of power patterns corresponding to the plurality of power consuming functions.

Figure 3B:
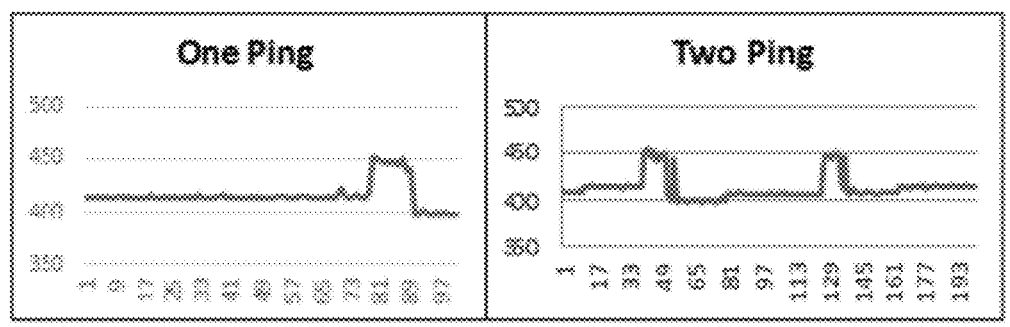
FIG. 3B also illustrates a detailed explanation of the system working in accordance with an embodiment of the present subject matter.
Figure 3C:
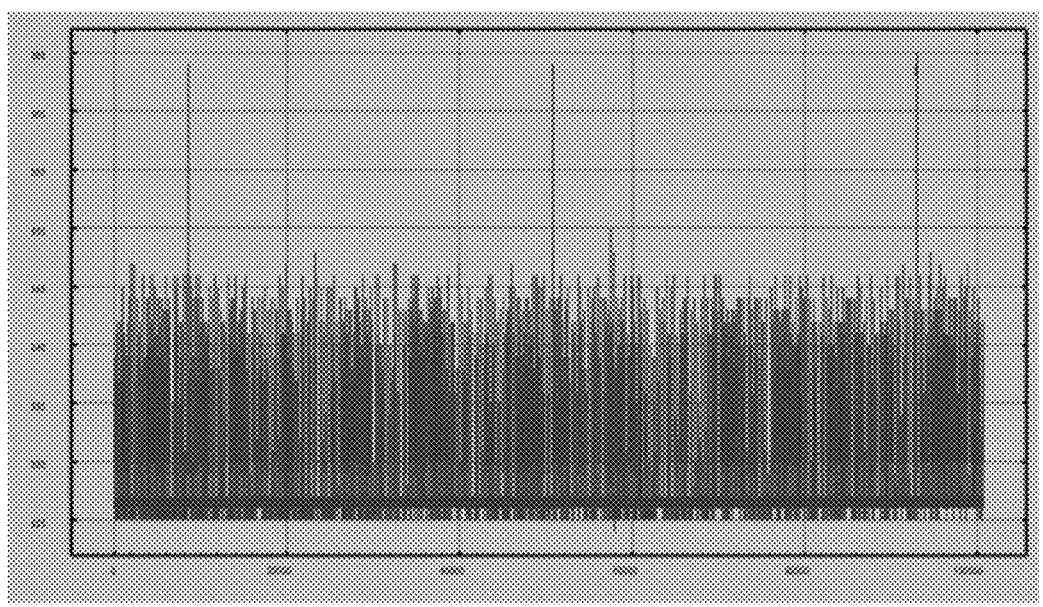
FIG. 3C illustrates a further detailed explanation of the system working in accordance with an embodiment of the present subject matter.
Figure 3D:
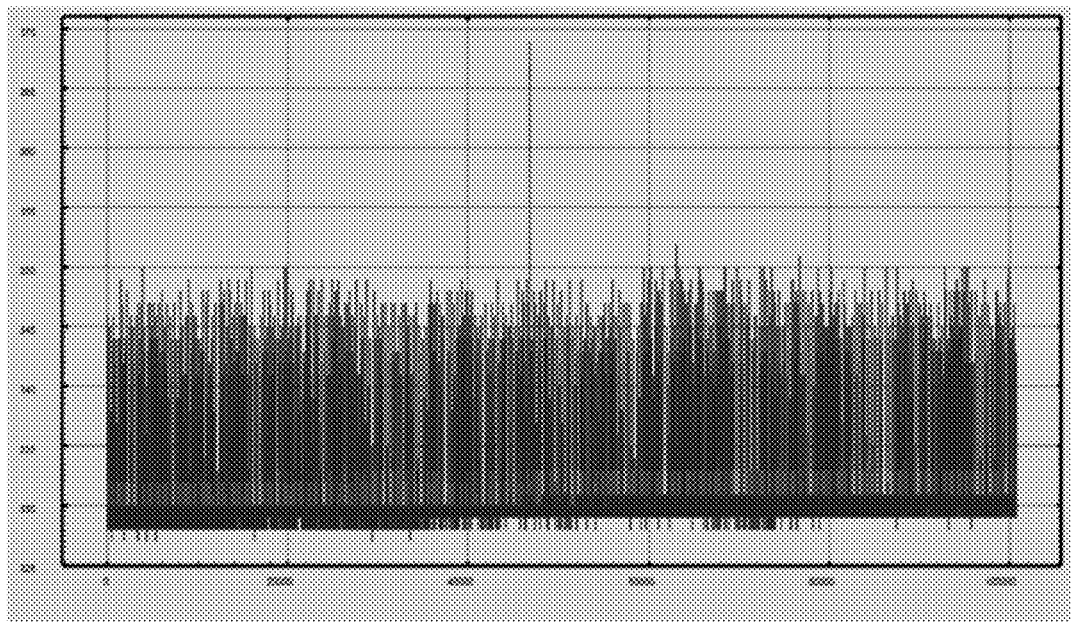
FIG. 3D illustrates a further detailed explanation of the system working in accordance with an embodiment of the present subject matter.
Figure 3E:
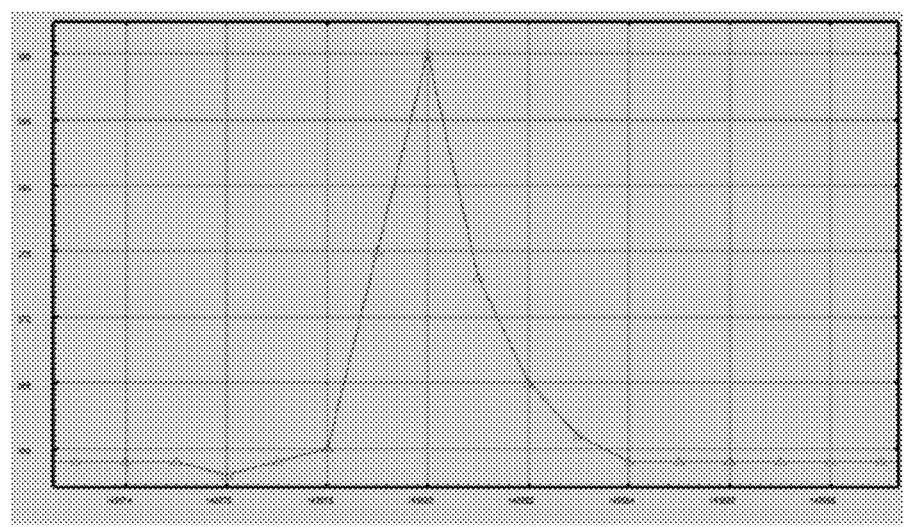
FIG. 3E illustrates a detailed explanation of working of the system, in accordance with an embodiment of the present subject matter.

A few examples of the power patterns generated can be seen from FIG. 3B to 3E. FIG. 3B shows the power pattern of a power consuming function associated with "Ping" operation. FIG. 3C shows the power pattern of a power consuming function associated with "3 Print" operation in a one minute interval, whereas, FIG. 3D shows the power pattern of a power consuming function which is associated with only "1 Print" operation. Further, the FIG. 3E shows the overall power pattern of the power consuming function associated with the "Print" operation. The plurality of power patterns generated may be stored in power pattern database 226 of the system 102. Further, the power patterns generated has peak-level fluctuations and non-peak level fluctuations as shown in FIG. 3A. Now, the system 102 will only concentrate on the powers patterns which are associated with the peak-level fluctuations.

In the next step, the matching module 214 of the system 102 matches each power pattern, of the plurality of power patterns, which corresponds to the peak-level fluctuations with a pre-stored plurality of power patterns, whereas the pre-stored power patterns are associated either with standard functions or network operations. Further, the pre-stored power patterns are also stored in the power pattern database 226 of the system 102. However, according to embodiments of present disclosure, it may happen that none of the power patterns of the plurality of power patterns matches with the pre-stored plurality of power patterns. In such situation, the generating module 212 of the system 102 may generate an exception message indicating that none of the power patterns is matched with the pre-stored plurality of power patterns.

The purpose of this matching is to identify those power patterns i.e., one or more power patterns, amongst the plurality of power patterns, having maximum peak value indicating a highest peak-level fluctuation. Thus, it must be understood that the identified one or more power patterns, with the maximum peak value, indicates high power consumption. However, the frequency of occurrence of the identified one or more power patterns may not may same, and therefore, it is required to further identify only those power patterns whose occurrence is high.

Thus, according to an embodiment of present disclosure, the determining module 216 of the system 102 determines the occurrence of the one or more power patterns having the maximum peak value for a predefined time interval. In one example, the determining module 216 may determine only those power patterns, amongst the one or more power patterns, whose occurrence count is at least five (5) in an interval of 1 hour (i.e., the predefined time interval). Thus, based on the occurrence, the identifying module 218 of the system 102 identifies at least one power consuming function corresponding to at least one power pattern of the one or more power patterns having the maximum peak value. Now, it becomes clear to the system 102 that the at least one power consuming function is most power intensive or power hungry function amongst the plurality of functions present in the program code 304 of the device 302. As can be seen in FIG. 3A, that "Function 2" is identified as the most power hungry function amongst the other functions.

Now, in the next step, the generating module 212 of the system 102 generates the recommendation for the aforesaid at least one power consuming function. The recommendation comprises one or more changes in a code section 304-B, of the program code 304, associated with the at least one power consuming function in order to optimize the power consumption of the device 302. This way, it can be also said that the present disclosure optimizes the power consumption of the devices in a non-intrusive way i.e., by just reading power consumption usage of the device while in execution. According to embodiments of present disclosure, the generating module 212 may further generate a recommendation suggesting an alternative function for replacing the at least one power consuming function.

Figure 4:
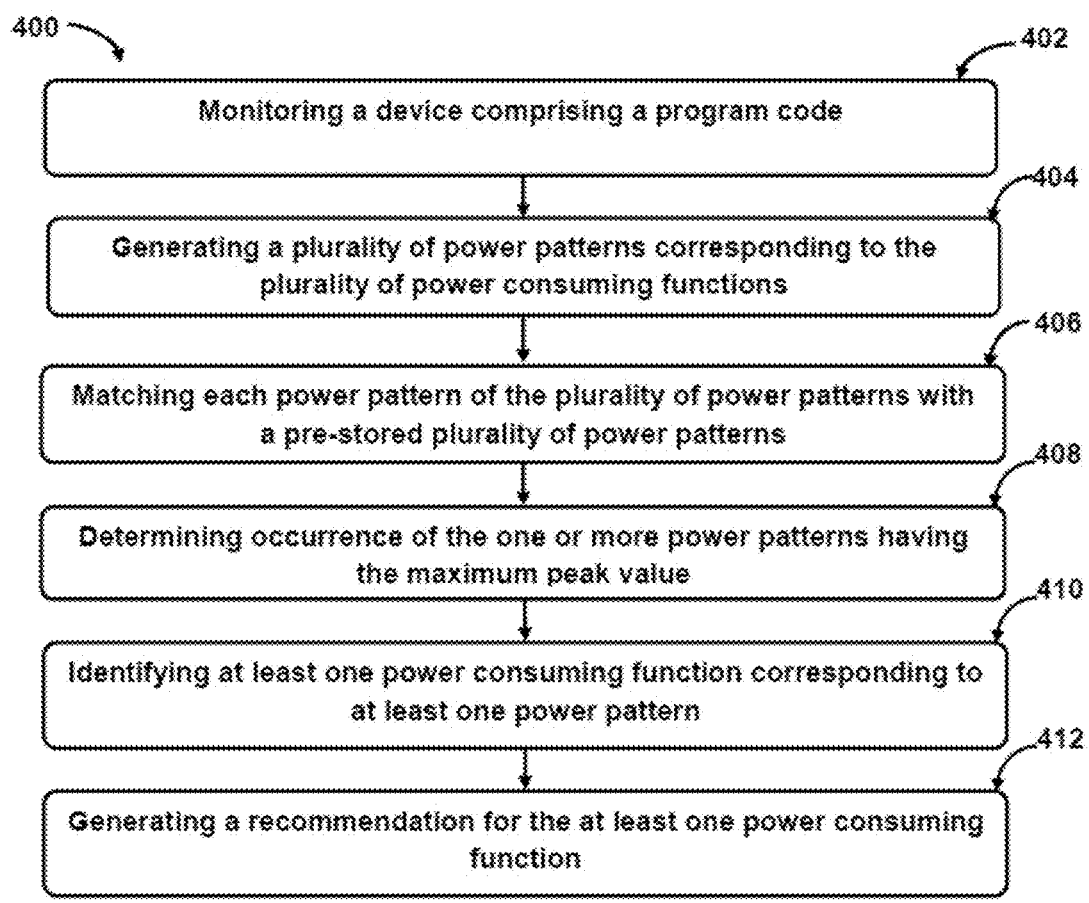
FIG. 4 illustrates a method for optimizing power consumption of the one or more devices, in accordance with an embodiment of the present subject matter.

Referring now to FIG. 4, the method of optimizing power consumption of one or more devices is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described system 102.

At block 402, a device comprising a program code may be monitored. Further, the program code may comprise a plurality of power consuming functions corresponding to a plurality of functionalities associated with the device.

At block 404, a plurality of power patterns may be generated corresponding to the plurality of power consuming functions. Further, the plurality of power patterns may be generated based on a voltage change when an electrical power is supplied to the device. Further, each power pattern has peak-level fluctuations and non-peak level fluctuations.

At block 406, each power pattern of the plurality of power patterns that corresponds to the peak-level fluctuations may be matched with a pre-stored plurality of power patterns in order to identify one or more power patterns, amongst the plurality of power patterns, having a maximum peak value indicating a highest peak-level fluctuation.

At block 408, occurrence of the one or more power patterns having the maximum peak value for a predefined time interval may be determined.

At block 410, at least one power consuming function corresponding to at least one power pattern, of the one or more power patterns having the maximum peak value, may be identified based on the occurrence.

At block 412, a recommendation may be generated for the at least one power consuming function. Further, the recommendation generated may comprise one or more changes in a code section, of the program code, associated with the at least one power consuming function in order to optimize the power consumption of the device.

Although implementations for methods and systems for optimizing the power consumption of the one or more devices have been described in language specific to structural features and/or methods, it is to be understood that the appended claims are not necessarily limited to the specific features or methods described. Rather, the specific features and methods are disclosed as examples of implementations for optimizing the power consumption of the one or more devices.

We claim:

1. A method for optimizing power consumption of one or more devices, the method comprising:
    monitoring, by a processor, a device comprising a program code, wherein the program code comprises a plurality of power consuming functions corresponding to a plurality of functionalities associated with the device;
    generating, by the processor, a plurality of power patterns corresponding to the plurality of power consuming functions, wherein the plurality of power patterns is generated based on a voltage change when an electrical power is supplied to the device, and wherein each power pattern has peak-level fluctuations and non-peak level fluctuations;
    matching, by the processor, each power pattern of the plurality of power patterns that corresponds to the peak-level fluctuations with a pre-stored plurality of power patterns in order to identify one or more power patterns, amongst the plurality of power patterns, having a maximum peak value indicating a highest peak-level fluctuation;
    determining, by the processor, occurrence of the one or more power patterns having the maximum peak value for a predefined time interval;
    identifying, by the processor, at least one power consuming function corresponding to at least one power pattern, of the one or more power patterns having the maximum peak value, based on the occurrence; and
    generating, by the processor, a recommendation for the at least one power consuming function, wherein the recommendation comprises one or more changes in a code section, of the program code, associated with the at least one power consuming function in order to optimize the power consumption of the device.

2. The method of claim 1, wherein the pre-stored plurality of power patterns is associated with at least one of standard functions and network operations.

3. The method of claim 1, further comprising generating an exception message if the plurality of power patterns fails to match with the pre-stored plurality of power patterns.

4. The method of claim 1, further comprising suggesting an alternative function for replacing the at least one power consuming function.

5. A system for optimizing power consumption of one or more devices, wherein the system comprises:
    a processor;
    a memory coupled with the processor, wherein the processor executes a plurality of modules stored in the memory, and wherein the plurality of modules comprises:
    a monitoring module to monitor a device comprising a program code, wherein the program code comprises a plurality of power consuming functions corresponding to a plurality of functionalities associated with the device;
    a generating module to generate a plurality of power patterns corresponding to the plurality of power consuming functions, wherein the plurality of power patterns is generated based on a voltage change when an electrical power is supplied to the device, and wherein each power pattern has peak-level fluctuations and non-peak level fluctuations;
    a matching module to match each power pattern of the plurality of power patterns that corresponds to the peak-level fluctuations with a pre-stored plurality of power patterns in order to identify one or more power patterns, amongst the plurality of power patterns, having a maximum peak value indicating a highest peak-level fluctuation;

a determining module to determine occurrence of the one or more power patterns having the maximum peak value for a predefined time interval;

an identifying module to identify at least one power consuming function corresponding to at least one power pattern, of the one or more power patterns having the maximum peak value, based on the occurrence; and the generating module to generate a recommendation for the at least one power consuming function, wherein the recommendation comprises one or more changes in a code section, of the program code, associated with the at least one power consuming function in order to optimize the power consumption of the device.

6. The system of claim 5, wherein the pre-stored plurality of power patterns is associated with at least one of standard functions and network operations.

7. The system of claim 5, wherein the generating module generates an exception message if the plurality of power patterns fails to match with the pre-stored plurality of power patterns.

8. The system of claim 5, wherein the generating module further generates a recommendation suggesting an alternative function for replacing the at least one power consuming function.

9. The system of claim 5, wherein the voltage change is sensed using a power sensing circuit coupled with the processor.

10. A non-transitory computer readable medium embodying a program executable in a computing device for optimizing power consumption of one or more devices, the program comprising:

a program code for monitoring a device comprising a program code, wherein the program code comprises a plurality of power consuming functions corresponding to a plurality of functionalities associated with the device;

a program code for generating a plurality of power patterns corresponding to the plurality of power consuming functions, wherein the plurality of power patterns is generated based on a voltage change when an electrical power is supplied to the device, and wherein each power pattern has peak-level fluctuations and non-peak level fluctuations;

a program code for matching each power pattern of the plurality of power patterns that corresponds to the peak-level fluctuations with a pre-stored plurality of power patterns in order to identify one or more power patterns, amongst the plurality of power patterns, having a maximum peak value indicating a highest peak-level fluctuation;

a program code for determining occurrence of the one or more power patterns having the maximum peak value for a predefined time interval;

a program code for identifying at least one power consuming function corresponding to at least one power pattern, of the one or more power patterns having the maximum peak value, based on the occurrence; and a program code for generating a recommendation for the at least one power consuming function, wherein the recommendation comprises one or more changes in a code section, of the program code, associated with the at least one power consuming function in order to optimize the power consumption of the device.

\* \* \* \* \*